United States Patent
Gu et al.

(10) Patent No.: US 9,926,225 B2
(45) Date of Patent: Mar. 27, 2018

(54) MEDIA AND METHODS FOR ETCHING GLASS

(71) Applicant: CORNING INCORPORATED, Corning, NY (US)

(72) Inventors: Yunfeng Gu, Painted Post, NY (US); Jun Hou, Painted Post, NY (US); Timothy James Orcutt, Corning, NY (US); Daniel Arthur Sternquist, Horseheads, NY (US); Jeffery Scott Stone, Addison, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/363,147

(22) PCT Filed: Dec. 10, 2012

(86) PCT No.: PCT/US2012/068735
§ 371 (c)(1),
(2) Date: Jun. 5, 2014

(87) PCT Pub. No.: WO2013/101444
PCT Pub. Date: Jul. 4, 2013

(65) Prior Publication Data
US 2014/0339194 A1 Nov. 20, 2014

Related U.S. Application Data

(60) Provisional application No. 61/581,821, filed on Dec. 30, 2011.

(51) Int. Cl.
C03C 15/02 (2006.01)
C09K 13/08 (2006.01)
C09K 13/04 (2006.01)

(52) U.S. Cl.
CPC .............. *C03C 15/02* (2013.01); *C09K 13/04* (2013.01); *C09K 13/08* (2013.01)

(58) Field of Classification Search
CPC . C09K 13/08; C03C 15/02; C23F 1/14; C23F 1/16; C23F 1/42
(Continued)

(56) References Cited

U.S. PATENT DOCUMENTS 4,125,594 A 11/1978 Su et al.
4,332,649 A 6/1982 Salzle
(Continued)

FOREIGN PATENT DOCUMENTS

DE 3038985 5/1982
DE 3123908 1/1983
(Continued)

OTHER PUBLICATIONS

Frayret et al; Solubility of $(NH_4)_2SiF_6$. $K_2SiF_6$, and $Na_2SiF_6$ in Acidic Solutions; Chemical Physics Letters, 427, (2006) 356-364.
(Continued)

*Primary Examiner* — Lan Vinh
(74) *Attorney, Agent, or Firm* — John T. Haran

(57) ABSTRACT

Described herein are aqueous acidic glass etching solutions or media comprising HF and $H_2SO_4$, wherein HF is present in concentrations not exceeding about 1.3M. The etching solutions are used to treat glass articles such as thin glass sheets at above-ambient temperatures to etch slight thicknesses of surface glass therefrom, the etching solutions exhibiting improved stability against dissolved glass precipitation and rapid glass removal rates at slightly elevated temperatures.

11 Claims, 4 Drawing Sheets

(58) Field of Classification Search
USPC ........ 252/79.1, 79.2, 79.3, 79.4; 216/97.103, 216/104
See application file for complete search history.

(56) References Cited

U.S. PATENT DOCUMENTS

| | | | |
|---|---|---|---|
| 4,555,304 A | 11/1985 | Salzle | |
| 7,776,756 B1* | 8/2010 | Okuchi | H01L 21/31111 438/746 |
| 8,476,107 B2* | 7/2013 | Kumar | H01L 45/1633 438/104 |
| 2003/0064196 A1* | 4/2003 | Kurachi | C03C 15/00 428/141 |
| 2003/0205558 A1* | 11/2003 | Kuzuwa | C03C 3/087 216/97 |
| 2004/0166242 A1* | 8/2004 | Osawa | H01L 21/31111 427/376.1 |
| 2005/0230355 A1* | 10/2005 | Salzle | C03C 15/02 216/97 |
| 2008/0038625 A1* | 2/2008 | Abd Elhamid | C22B 7/007 429/49 |
| 2009/0035213 A1* | 2/2009 | Takayasu | B01J 21/063 423/609 |
| 2009/0110914 A1 | 4/2009 | Zhuang et al. | |
| 2010/0266874 A1* | 10/2010 | Uchiyama | B24B 9/065 428/846.9 |
| 2011/0062849 A1 | 3/2011 | Carlson et al. | |
| 2011/0165393 A1* | 7/2011 | Bayne | C03C 15/02 428/215 |

FOREIGN PATENT DOCUMENTS

| | | |
|---|---|---|
| GB | 829605 | 3/1960 |
| KR | 943321 | 2/2010 |
| KR | 2011036296 | 4/2011 |

OTHER PUBLICATIONS

Arakawa et al. "Pinhole-free Pyrex Glass Etching using HF-H2SO4 mixed acid and its applications for a PDMS microflow system", The 13th International Confrence on Solid-State Sensors, Actuators and Microsytems, Seoul, Korea, Jun. 5-9, 2005.
International Search Report and Written Opinion PCT/US2012/068735 dated May 14, 2013, 11 Pgs.

* cited by examiner

MEDIA AND METHODS FOR ETCHING GLASS

CROSS-REFERENCE TO RELATED APPLICATIONS

This application claims the benefit of priority of U.S. Provisional Patent Application Ser. No. 61/581,821 filed on 30 Dec. 2011, the contents of which are relied upon and incorporated herein by reference in their entirety as if fully set forth below.

TECHNICAL FIELD

The compositions and methods of the present disclosure relate generally to the polishing and/or strengthening of glass, and more particularly to acidic media for enhancing the surface characteristics of glass articles and methods for using them.

BACKGROUND

The wet chemical etching of silicate glasses with aqueous hydrofluoric acid-containing media, for example to polish the surfaces of the glass or to strengthen the glasses via the removal of surface flaws, is well known. HF-containing media are capable of dissolving silica and other constituents of silicate glasses, although precipitates of those constituents, commonly referred to as "sludge", are generally produced as by-products of that dissolution. Depending upon the compositions of the media and the glasses being treated, compounds such as sulfates, bisulfates, fluorides and silicofluorides of the cationic constituents of the glasses can be precipitated.

These precipitates can be deposited on the surfaces of glasses being treated to form firmly adherent layers that can progressively reduce the etching rate. In addition, precipitate buildup on processing tools such as squeegee rollers and acid bath cooling coils can cause equipment malfunctions and/or damage to the glass surfaces. The resulting need to clean tooling and/or the surfaces of glass articles being treated eventually requires that the etching processes be interrupted or terminated, with substantial decreases in production rates and increases in labor costs.

A number of measures to address the problem of sludge buildup in glass etching media have been proposed. In one approach, concentrations of sodium and/or potassium ions in the etching bath resulting from the dissolution of glass constituents are continuously reduced. The desired reductions may be achieved through one or a combination of measures including: (i) adding fluorosilicic acid to the bath; (ii) precipitating silicofluorides of the alkali ions and filtering off the precipitates; (iii) mercury cell electrolysis of the bath to form sodium and/or potassium amalgams, (iv) bath electrolysis in a cell having a cation semi-permeable membrane; and (v) utilizing alkali metal ion exchangers. An alternative ion-exchange approach involves treating the etching solution with a weak anion exchange resin of the polyamine type to remove $SiF_6^{2-}$ ions, thereby reducing the sludge-forming capacity of the solution.

Mechanical approaches for controlling sludge buildup include the use of a supplemental buffer tank for carrying out a filtration of precipitates from etching solution circulated from the main etching tank. In a variation on the approach of maintaining an effective HF concentration in the bath, fluoride gas generated during the etching process is collected and condensed to produce supplemental HF for recycling back into the etchant tank. Alternatively, it has been proposed to neutralize at least a portion of the hydrofluosilicic acid generated during etching while concurrently adding sufficient hydrofluoric acid to the bath to maintain the initial concentration of free hydrofluoric acid therein. Hydrofluorosilicic acid neutralization is achieved through the addition to the bath of a soluble potassium salt such as potassium carbonate, precipitating an insoluble potassium silicofluoride within the bath which can then be efficiently removed by filtration.

As is apparent from the foregoing, however, most of the proposed solutions to the problem of sludge buildup involve the design and construction of supplemental systems that are often quite costly and that may not be practical where operating spaces are limited. In addition, new chemicals can be required that are expensive, or that have the potential for changing bath chemistry in ways that may adversely affect etching efficiencies or lead to the formation of new, possibly undesirable, by-products. Thus, there remains a need for improved methods for addressing the problem of sludge in an efficient and economical manner.

BRIEF SUMMARY

In accordance with the present disclosure, the problem of sludge accumulations in etching media is addressed through modifications in the chemistry of the etching solutions as well as the conditions under which etching is carried out. More particularly, the quantity of precipitates or sludge produced during etching is minimized by controlling the compositions and concentrations of the acids used to formulate the etching media, and by properly controlling the etching temperature.

Thus, disclosed herein are improved methods for treating a glass article to etch at least a portion of a surface thereof, aqueous acidic glass etching media or solutions, and acid baths for etching glass.

One type of method for treating a glass article to etch surface glass therefrom generally includes a step of contacting the glass article with an aqueous acidic etching solution comprising both HF and $H_2SO_4$, where HF is present in a concentration not exceeding 1.3 moles per liter (M) and where the contacting of the article is conducted at a temperature in excess of 25 degrees Celsius (° C.). In certain implementations of this type of method, the step of contacting is carried out at a temperature of at least 30° C.

In certain situations, the step of contacting will entail spraying the glass article with the aqueous acidic etching solution at a solution temperature of about 30 to about 45° C.

The contacting step can be conducted for a time effective to remove a glass surface layer having a thickness of about 1 to about 4 micrometers from the glass article.

In certain implementations, the glass article can be an alkali aluminosilicate glass that comprises potassium oxide. In different implementations, the glass article can be any glass (including alkali aluminosilicate glass) that includes a potassium oxide surface compression layer. For example, the glass article can be any glass composition that has a surface compression layer containing potassium oxide in a concentration greater than or equal to about 10 weight percent based on the weight of the surface compression layer. This or any other type of employed glass articles can have a thickness that is less than or equal to about 2 millimeters.

In certain implementations of this type of method, the aqueous acidic etching solution can consist essentially of HF, H₂SO₄, water, and dissolve glass constituents after the contacting step. In such implementations, the aqueous acidic etching solution can have dissolved glass constituents at a concentration of about 1 to about 12 grams per liter (g/l) of the aqueous acidic etching solution.

One type of aqueous acidic glass-etching medium that exhibits improved resistance to the development of harmful sludge accumulations, such that the service lifetimes of the solutions are considerably lengthened, includes an acid mixture comprising HF and H₂SO₄, wherein HF is present at a concentration not exceeding 1.3M and H₂SO₄ is present at a concentration in the range of about 0.5M to about 1.5M.

In certain implementations of the aqueous acidic glass etching solution, the acid mixture can consist essentially of HF and H₂SO₄.

Within the ranges of concentrations of the acids recited above, the disclosed etching solutions exhibit efficient etching performance even when supporting significant concentrations of dissolved glass. Thus, in certain implementations, the aqueous acidic glass etching solution can further include dissolved glass constituents at a concentration of about 1 to about 12 g/l. Accordingly, in certain overlapping or alternative implementations, the aqueous acidic glass etching solution can consist essentially of HF, H₂SO₄, water and dissolved glass constituents.

In certain implementations, the aqueous acidic glass etching solution can have an elevated temperature of about 30 to about 45° C.

In certain embodiments, the disclosed aqueous acidic glass etching solutions to be employed for processing glass articles are provided in the form of an acidic etching bath (i.e., a reservoir of aqueous acidic etching solution into which glass articles may be dipped for etching, or from which solution may be drawn for application to the articles by other methods such as spraying). One type of etching bath thus provided includes water, a combination of acids consisting essentially of HF and H₂SO₄, dissolved glass constituents, and a precipitate of K₂SiF₆. The concentration of HF in such etching baths does not exceed about 1.3M.

The presently disclosed methods and solutions are based in part on the discovery that the buildup of sludge-forming precipitates in HF-containing etching solutions can be considerably reduced by reducing HF concentrations in those solutions. Further, such reductions can be effected without sacrificing glass etching efficiency as measured by the rates of surface glass removal from glass articles being treated. Thus, the service lifetimes of etching bath solutions can be extended without affecting process throughputs. Further advantages include ease of implementation in existing etching environments since extensive modifications of existing systems and equipment are not required, shortened downtimes for system maintenance, and substantially reduced waste treatment and disposal costs.

BRIEF DESCRIPTION OF THE DRAWINGS

The compositions and methods of the present disclosure are further described below with reference to the appended drawings wherein.

DETAILED DESCRIPTION

Figure 1:
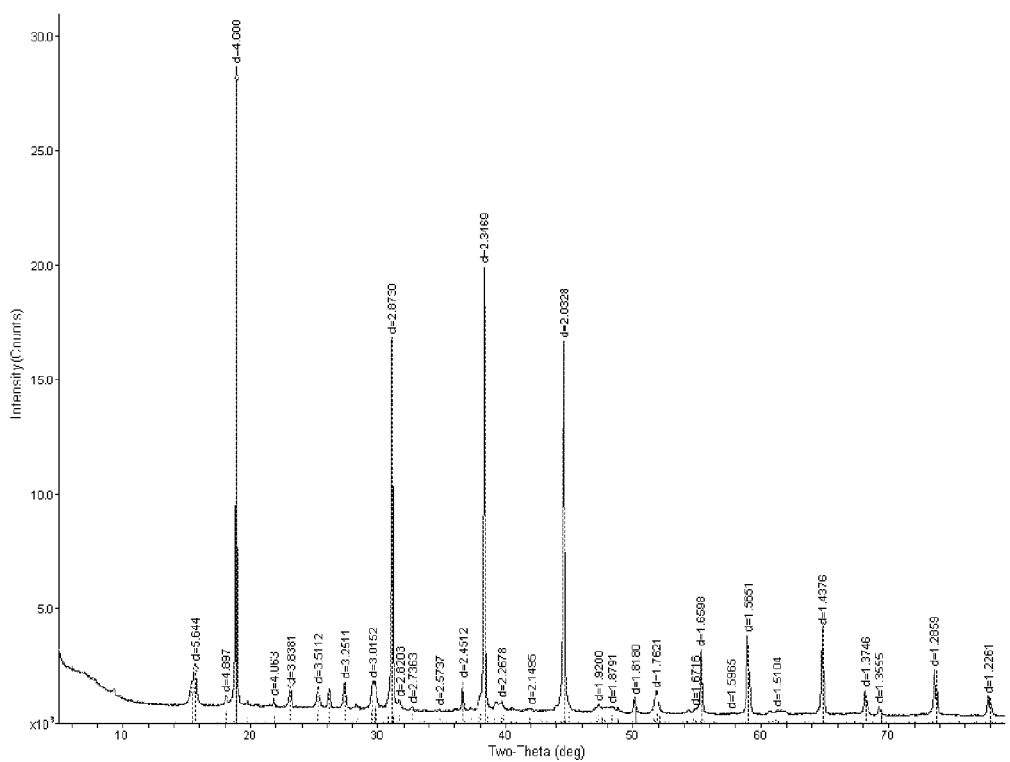
FIG. 1 is a powder X-ray diffraction pattern for a solid precipitate isolated from an aqueous acidic glass etching solution.

While the materials and methods provided in accordance with the present disclosure can be employed in a variety of glass polishing and etching processes, they offer particular advantages for the strengthening of glass sheets such as currently used in the manufacture of video or information displays. Strengthened glass sheets are being employed with increasing frequency in the manufacture of such displays for televisions, desktop, laptop, and tablet computers, handheld devices including media players and cellular telephones, and the like. In general, these applications require glass sheets of slight thickness, high flexural strength, good resistance to damage from impact and abrasion, and the like.

Glass sheets exhibiting the required combination of strength and durability can be produced by strengthening drawn glass sheets of optical quality with a combination of chemical tempering and polishing procedures. Sections of thin alkali aluminosilicate glass sheets are first subjected to ion-exchange strengthening whereby sodium ions within the surfaces of the sheets are removed and replaced by potassium ions to develop strengthening compressive surface stresses in the sheets. Thereafter the chemically strengthened (tempered) sheets are further strengthened by surface etching in HF media to reduce and/or remove surface flaws from glass surfaces.

In accordance with present practice, the surface etching of an ion-exchange-strengthened glass sheet as above described typically involves a brief exposure of the sheet to an aqueous acidic HF—H₂SO₄ etching medium at ambient temperatures (about 24° C.) to remove a glass surface layer on the order of about 1 to about 4 micrometers (μm) in thickness from the surfaces of the sheet. This slight etching procedure has the effect of mitigating strength-limiting flaws without unacceptably reducing surface compression levels in the sheet.

Unfortunately, however, the etching media and methods currently employed for these purposes can offer only limited stability against the precipitation of dissolved glass constituents. HF-based media containing dissolved glass are unstable over time, with precipitation continuing and sludge accumulations growing as the solutions age even without further additions of dissolved glass. Further, the rates of accumulation are higher as the concentrations of dissolved glass increase.

Tables 1 and 2 below present data illustrating the combined effects of dissolved glass concentration and solution aging for an aqueous acidic etching medium such as presently used for the supplemental etch-strengthening of chemically tempered glass sheets. The etching solution used to generate the data is an aqueous acidic solution containing HF and H₂SO₄ at concentrations of 1.5M HF and 0.9M, respectively. Such a solution has been used to etch the surfaces of chemically tempered glass sheets having a nominal composition as follows (in mole %): 69% SiO₂, 9% Al₂O₃, 14% Na₂O, 1% K₂O, 6% MgO, and 1% CaO at ambient temperatures to mitigate the effects of surface flaws therein.

The surface glass removed from such sheets by brief etching is rich in potassium ($K_2O$) as a consequence of the chemical tempering (ion-exchange strengthening) to which the sheets are preliminarily subjected. Table 1 below lists a glass composition that is representative of the glass that is removed by dissolution from the surfaces of a chemically strengthened glass sheet subjected to brief etching. The composition is reported in both weight percent and mole percent on the oxide basis.

TABLE 1

Dissolved Glass Composition

| Oxide | Wt % | mol % |
|---|---|---|
| $SiO_2$ | 61.6 | 69.59 |
| $Al_2O_3$ | 12.8 | 8.52 |
| $Na_2O$ | 0.16 | 0.17 |
| $K_2O$ | 20.2 | 14.55 |
| MgO | 3.81 | 6.42 |
| CaO | 0.46 | 0.56 |
| $SnO_2$ | 0.4 | 0.18 |
| $Fe_2O_3$ | 0.02 | 0.01 |

A series of solutions based on the above-noted etching medium, formulated to contain various concentrations of dissolved glass of the above composition, is prepared to evaluate the stability of the media and the sludge-forming characteristics thereof during a typical period of aging. The procedures employed for solution preparation and the subsequent evaluations are as follows.

A quantity of glass of the Table 1 composition above is first melted and ground into glass powder of below 100 mesh US Standard Sieve particle size. The resulting powder is then dissolved in various concentrations in separate samples of the above-disclosed $HF$—$H_2SO_4$ etching medium to produce a series of glass-containing sample solutions with dissolved glass concentrations in the range of about 4 to about 12 g/L of solution. The solutions are prepared in clear NALGENE bottles with about 700 revolutions per minute (rpm) stirring, complete glass dissolution typically being attained within about 3 hours at ambient temperatures. The HF concentrations of the solutions are maintained at about 1.5 M during the process of glass dissolution.

Stirring of the thus-prepared samples is continued for about 7 days, with daily evaluations of the sample solutions to track solution appearance and precipitate formation. Thereafter stirring is terminated and the solutions are allowed to settle for about 5 hours to complete precipitate settling. Each sample solution is then centrifuged, the supernatant liquid is discarded, and the centrifuged deposit of precipitate is dried at room temperature, weighed, and subjected to X-ray diffraction analysis to identify crystal phases present in the precipitated deposit.

The major component of the precipitates formed in all of the deposits is potassium silicofluoride ($K_2SiF_6$), thought to be a product of the reaction $K^+ + SiF_6^{2-} \rightarrow K_2SiF_6\downarrow$. Also identified in some of the precipitate samples are minor phases of $MgAlF_5(H_2O)_2$, $Al_2(OH)_{2.76}F_{3.24}(H_2O)$, $KHSO_4$ and $Na_{0.41}Mg_{0.452}Al_{1.548}F_{4.578}(OH)_{1.422}(H_2O)_{0.835}$, the amounts of the minor phases depending mainly upon the acid concentrations and the amount of dissolved glass originally present in the sample solutions. FIG. 1 presents an X-ray diffraction pattern produced from the analysis of a dried precipitate isolated from a sample solution containing about 10 g/L of dissolved glass, that pattern revealing the presence of all of the above phases in the precipitate.

Representative results obtained from etching solution evaluations conducted as above described are set forth in Table 2 below. Included in Table 2 for each of 6 different sample solutions evaluated over a 7-day evaluation period are entries for dissolved glass content in grams per liter (g/L), as well as entries reflecting the presence or absence of precipitated phases therein, the presence of such phases being indicated by the entry "P" for the corresponding solution on the corresponding day.

Also reported for each etching solution on each day is an evaluation of solution clarity, including an entry of clear (C) if visibly free of suspended solids, as slightly milky (SM) if containing small amounts of suspended solids, as milky (M) at increasing suspended solids concentrations, and as heavily milky (HM) at high suspended solids concentrations.

TABLE 2

Etching Solution Aging Characteristics

| Sample ID | Glass conc. g/L | Day 1 | Day 2 | Day 3 | Day 4 | Day 5 | Day 6 | Day 7 |
|---|---|---|---|---|---|---|---|---|
| 1.5F-0.9S-4 | 4 | C | C | C | C | C | C | C |
| 1.5F-0.9S-7 | 7 | C | C | C | C | C, P | C, P | SM, P |
| 1.5F-0.9S-8 | 8 | SM | SM | SM, P | SM, P | M, P | M, P | M, P |
| 1.5F-0.9S-9 | 9 | SM, P | SM, P | M, P | M, P | M, P | M, P | HM, P |
| 1.5F-0.9S-10 | 10 | SM, P | SM, P | M, P | M, P | M, P | HM, P | HM, P |
| 1.5F-0.9S-12 | 12 | SM, P | SM, P | M, P | HM, P | HM, P | HM, P | HM, P |

The instability of such etching solutions containing more than minimal quantities of dissolved glass is evident from the data reported in Table 2. Thus, in most cases, the solutions become increasingly cloudy and form precipitated phases over time, with the rates of deterioration and precipitation increasing significantly at increasing dissolved glass concentrations.

Approaches for improving solution stability and reducing precipitation and sludge accumulation rates and levels have suggested modifying bath chemistry, and there is literature suggesting that increasing HF concentration could help. For example, Frayret et al. investigated the solubility of $K_2SiF_6$ in acidic solutions (J. Freyret, A Castetbon, G. Trouve, M. Poin-Gautier, Chemical Physics Letters, 427 (2006) 356-364), finding that $K_2SiF_6$ solubility can increase with increases in HF concentration and $H_2SO_4$ concentration. However, precipitation chemistry in acidic solutions containing dissolved glass is complex, and the Applicants of the present disclosure have unexpectedly found the reverse to be the case for the types of aluminosilicate glasses presently favored for use in information display applications.

Table 3 below sets forth data relating to the stability of $HF/H_2SO_4$ solutions of varying HF concentration containing substantial concentrations of dissolved potassium-exchanged aluminosilicate glass having the composition recorded in Table 1 above. The data are representative of results generated from a study of four different $HF/H_2SO_4$ etching solutions comprising HF in concentrations of about 1.5M, about 1.0M, about 0.5M and about 0.3M at a constant $H_2SO_4$ concentration of about 0.9M as recorded in the Table. All solutions comprise dissolved glass at a concentration of about 10 g/L, prepared as described above and subjected in the same manner to aging evaluations over a 7-day period with constant stirring at ambient (about 22° C.) temperature.

The data entries in Table 3 correspond in type to the entries in Table 2, including indications of solution cloudiness and the presence of visible precipitate accumulations for each of the solutions at each succeeding day.

TABLE 3

Stabilization of Etching Solutions

| Sample code | HF conc. M | Day 1 | Day 2 | Day 3 | Day 4 | Day 5 | Day 6 | Day 7 |
|---|---|---|---|---|---|---|---|---|
| 0.3F-0.9S-10 | 0.3 | SM, P | SM, P | SM, P | SM, P | SM, P | SM, P | SM, P |
| 0.5F-0.9S-10 | 0.5 | SM, P | SM, P | SM, P | SM, P | SM, P | SM, P | SM, P |
| 1.0F-0.9S-10 | 1.0 | SM, P | SM, P | SM, P | SM, P | SM, P | SM, P | M, P |
| 1.5F-0.9S-10 | 1.5 | SM, P | SM, P | M, P | M, P | M, P | HM, P | HM, P |

As the Table 3 data indicate, solutions comprising HF concentrations in the range of about 0.3M to about 1.0M generally exhibit only slight milkiness or cloudiness over the first six to seven days of aging at dissolved glass levels of about 10 g/L, such cloudiness indicating relatively small concentrations of suspended solids. In contrast, solutions containing HF in about 1.5M concentrations exhibit intermediate levels of suspended solids as early as the third day of aging after inoculation with about 10 g/L of potassium aluminosilicate glass. In relative terms, the levels of cloudiness observed during about one week of aging for a set of specimen solutions evaluated as above described was judged to follow the sequence 1.5M>1.0M>0.5M≈0.3M, indicating that that higher HF concentrations in solutions for etching these aluminosilicate glasses led to higher rather than lower rates of precipitate generation.

Figure 2:
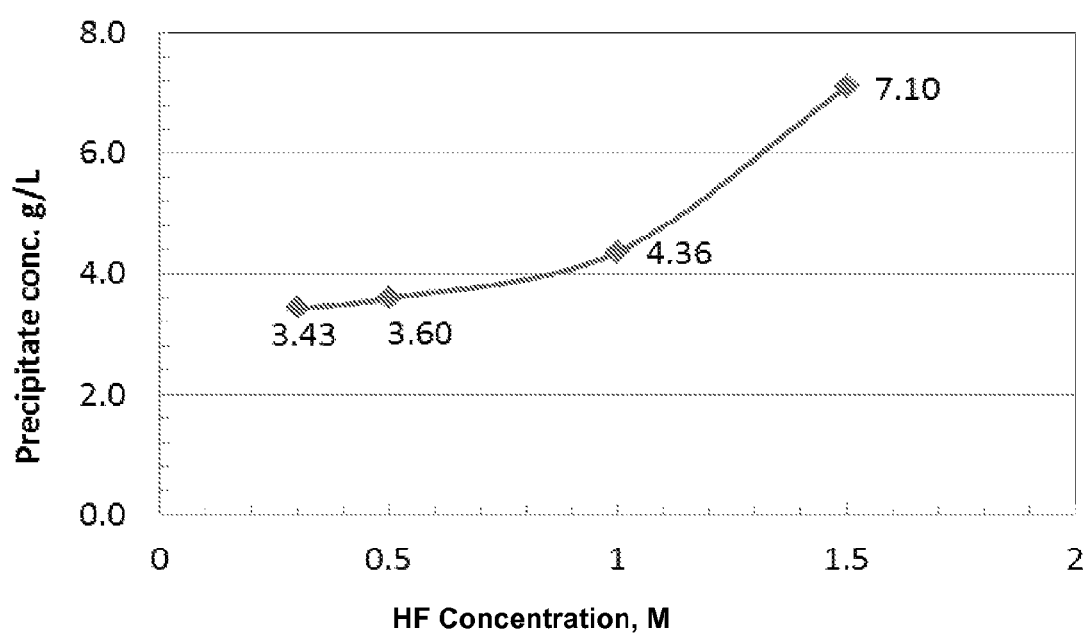
FIG. 2 is a graphical representation of the solid precipitate concentration relative to HF concentration in various aqueous acidic glass etching solutions.
Figure 3:
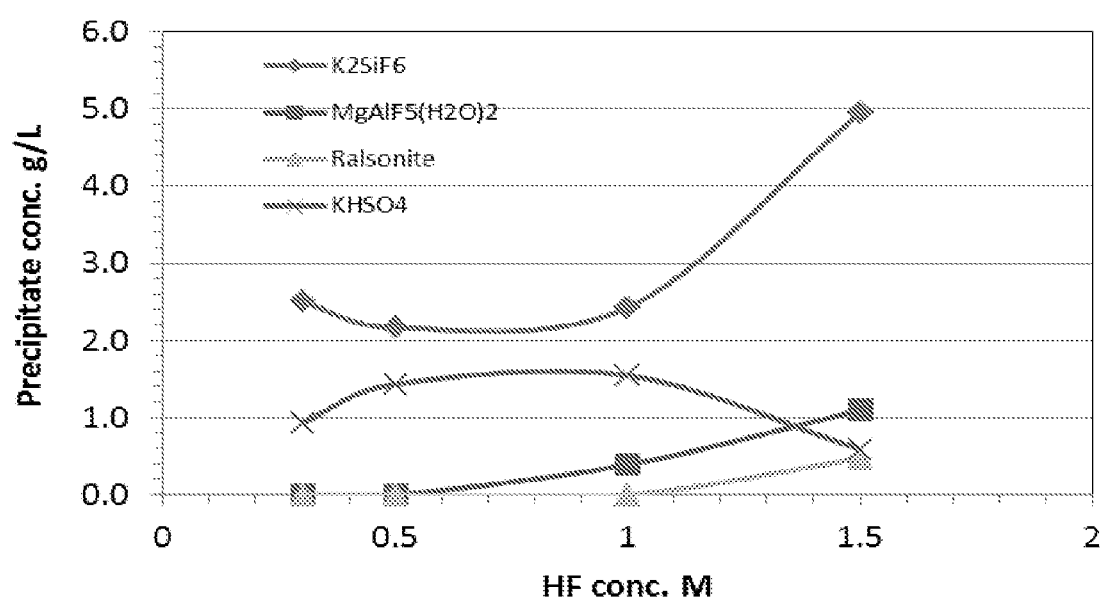
FIG. 3 is a graphical representation of the solid precipitate concentration relative to HF concentration for various constituents of the solid precipitate in various aqueous acidic glass etching solutions.

Measurements of the levels of accumulated precipitates or sludge in the above solutions follow the same pattern as the evaluations of suspended solids levels, confirming substantial differences in solution stability as between etching solutions with about 1.5M HF concentrations and solutions containing about 0.3 to about 1.0M HF concentrations. Precipitate accumulations measured after about one week of aging for the solutions reported in Table 3 typically indicate an about 38% reduction in accumulated sludge weight with a reduction from about 1.5M to about 1.0M in solution HF concentration, and an about 50% sludge weight reduction with a reduction from about 1.5M to about 0.5M in HF concentration. FIG. 2 of the drawings presents these results in a graphical format, plotting precipitate concentration, in grams/liter (g/L), as a function of etching solution HF concentration over the above range. Further, while an about 38% reduction in weight was observed for the overall sludge when the HF concentration was reduced from about 1.5M to about 1.0M, a compositional analysis, using powder X-ray diffraction, revealed that the weight of $K_2SiF_6$ in the sludge was reduced about 50%. FIG. 3 graphically presents the amount of each component in g/L in the precipitated sludge relative to etching solution HF concentration over the above range.

While aqueous acidic solutions comprising HF in reduced concentrations such as herein disclosed can be modified by the addition of optional constituents, including for example such optional components as other mineral or even organic acids, such additions are optional and not required for effective etching performance. Thus, in many embodiments, the methods described herein are practiced with fresh aqueous acidic etching solutions consisting essentially of HF, $H_2SO_4$, and water, or after some period of use, with solutions consisting essentially of those components together with dissolved glass constituents. Included are embodiments employing etching solutions containing dissolved glass in concentrations from about 1 to as high as about 12 g/L, the latter still exhibiting adequate surface glass dissolution rates for commercial practice.

For commercial applications involving the high-volume manufacture of thin strengthened glass sheets for information display applications, etching methods enabling more rapid removal of surface glass from thin (e.g., 2 millimeters or less in thickness) glass sheets are generally favored. Although solution stabilization through HF reductions in accordance with the methods of the present disclosure can slightly depress glass removal rates, it is found that rapid removal can readily be reestablished though even moderate increases in etching bath temperature. In addition, an unexpected benefit of such temperature increases is that rates of accumulation of sludge components such as potassium silicofluoride ($K_2SiF_6$) are simultaneously reduced.

These benefits may be illustrated through a comparison of the etching characteristics of an aqueous acidic etching solution provided in accordance with the present disclosure, when applied to a chemically strengthened commercial display glass sheet over a range of conventional and elevated temperatures. The etching solution evaluated is an aqueous solution of HF and $H_2SO_4$ in water in concentrations of about 1.0M HF and about 0.9M $H_2SO_4$.

A solution of that composition is applied by spraying to the surfaces of a chemically strengthened glass sheet of aluminosilicate glass having a nominal composition as follows (in mole %): 69% $SiO_2$, 9% $Al_2O_3$, 14% $Na_2O$, 1% $K_2O$, 6% MgO, and 1% CaO, the surface of that glass having the composition reported in Table 1 which includes a relatively high concentration of $K_2O$. In the known practice, removing surface glass from such a sheet to a depth-of-removal (DOR) of about 1.4 μm can be accomplished within about a minute using an etching solution of about 1.5M HF and about 0.9M $H_2SO_4$ in water applied at an ambient etching temperature of about 75 degrees Fahrenheit (° F.) or about 23.9° C.

Figure 4:
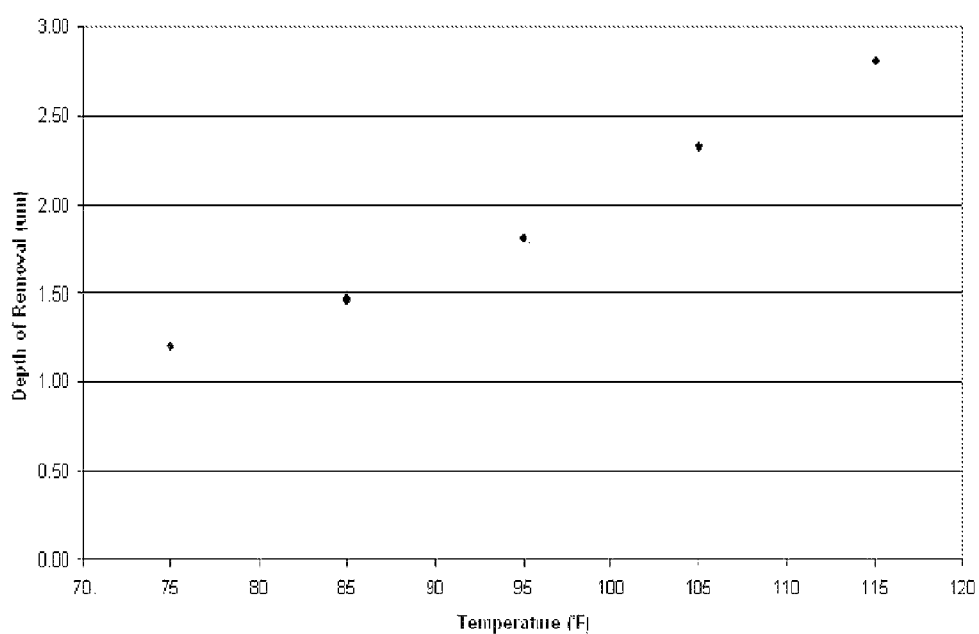
FIG. 4 is a graphical representation of the depth of the surface of a glass article that has been removed upon treatment with an aqueous acidic glass etching solution over a range of solution application temperatures.

FIG. 4 of the drawings presents data reflecting surface removal rates as a function of applied solution temperature for an about 1.0M HF/0.9M $H_2SO_4$ etching solution provided in accordance with the present disclosure. The removal rates are reported in terms of the depths of surface removal (DOR values) achieved during an approximately one-minute application of the presently disclosed etching solution to the surfaces of the aluminosilicate glass sheet at solution temperatures within the range of about 85° F. (about 29.4° C.) to about 105° F. (about 40.6° C.). As the data in FIG. 4 suggest, a DOR value in excess of about 1.4 μm can be achieved within a contact interval of about one minute utilizing a solution application temperature of about 85° F. (about 29.4° C.) or higher, the minimum temperature for that DOR being only about 10° F. (about 6° C.) in excess of that at which commercial solutions are typically applied. From this finding it is evident that embodiments of the disclosed methods wherein the step of contacting a glass article for a time sufficient to remove a glass surface layer of about 1 to about 4 μm thickness from the article can readily be practiced within industrially practical time limits.

The beneficial effects of elevated temperature etching on the rates of precipitation of dissolved glass constituents from $HF/H_2SO_4$ etching solutions are seen in the results of similar etching experiments conducted at two different temperatures. Two different aqueous acidic etching solutions are prepared to evaluate these effects. One solution contains HF and $H_2SO_4$ in concentrations of about 1.5M and about 0.5M respectively, together with about 7 g/L of dissolved glass (Solution #1), while the other solution contains HF and $H_2SO_4$ in concentrations of about 0.87M HF and about 0.9M $H_2SO_4$, together with about 8 g/L of dissolved glass (Solution #2). Samples of these two solutions are evaluated for precipitation characteristics over an about one-week period in two different regimes of processing temperature, i.e., at a conventional etching temperature of about 22° C. and at an elevated temperature of either about 31° C. or about 35° C.

Representative results of such evaluations are set forth in Table 4 below, wherein the observed precipitation rates are compared in grams per liter (g/L) of accumulated precipitates in the solutions following the seven-day aging period. As those results suggest, Solution #2 having a reduced HF concentration (but a higher concentration of dissolved glass) exhibits lower levels of accumulated precipitates at both evaluation temperatures than Solution #1 having a higher HF concentration. The net reduction in accumulated precipitates as between the concentrated HF solution evaluated at an ambient solution temperature and the reduced HF solution evaluated at the higher solution temperature is about 37%.

TABLE 4

Temperature Effects of Solution Aging

| Solution # | HF conc. (M) | $H_2SO_4$ conc. (M) | Dissolved glass conc. (g/L) | Bath temp. (° C.) | Precipitate conc. (g/L) |
| --- | --- | --- | --- | --- | --- |
| 1 | 1.5 | 0.5 | 7 | 22 | 3.03 |
|   | 1.5 | 0.5 | 7 | 31 | 2.53 |
| 2 | 0.87 | 0.9 | 8 | 22 | 2.23 |
|   | 0.87 | 0.9 | 8 | 35 | 1.91 |

In light of the foregoing it is apparent that embodiments of the above disclosed methods can be applied with particular advantage to the etching of glass articles intended for use in the production of display glass products in the form of thin glass sheets (e.g., glass sheets having a thickness not exceeding about 2 millimeters (mm)). Such embodiments are especially amenable to the etching of glass sheet comprising a $K_2O$-containing surface compression layer produced by the ion-exchange strengthening of alkali aluminosilicate glasses, particularly including glass sheets comprising a surface compression layer having an exposed surface comprising $K_2O$ in a concentration greater than about 10 weight percent.

For purposes of production efficiency, the application of the disclosed etching solutions to glass articles at elevated application temperatures can secure glass removal rates equal to or exceeding those secured through existing practice. For example, the use of aqueous acidic glass etching solutions within the above disclosed range of HF concentration that are heated to temperatures in the range of about 30 to about 45° C. provide adequate glass removal rates.

The technique selected for applying these solutions to glass surfaces is not critical. That is, a variety of techniques can be used, examples of which are dipping, spraying, inkjeting, and the like. By way of example, a heated bath of a selected etching solution can serve as a reservoir from which the solution can be applied by spraying onto the surfaces of a horizontal glass sheet. Such solutions can be useful even when carrying relatively high concentrations of dissolved glass with some concentrations of accumulated solid precipitates or sludge, due in part to the reduced precipitation and sludge accumulation rates exhibited by those solutions at the lower prescribed HF concentrations and higher prescribed solution temperatures. Particularly useful embodiments of such solutions include acid baths for glass etching containing HF at concentrations not exceeding about 1.3M, wherein the baths comprise water, an acid mixture consisting essentially of HF and $H_2SO_4$, dissolved glass constituents, and a $K_2SiF_6$ precipitate.

Solution aging data similar to that presented above also suggest that the quantities of precipitated solids that accumulate in $HF/H_2SO_4$ etching solutions depend to some degree on the concentration of $H_2SO_4$ therein. In one evaluation, a potassium-rich glass powder of the composition reported in Table 1 above is dissolved at a concentration of about 7 g/L in separate etching solution samples containing about 1.5M concentration of HF but covering a range of different $H_2SO_4$ concentrations. The $H_2SO_4$ concentrations cover a range from about 0.5M to about 2.7M.

Thus-prepared sample solutions containing about 0.9M and about 1.1M $H_2SO_4$ are found to be almost clear and free of precipitation following an about 7-day aging period with stirring at about 22° C., whereas solutions with higher or lower $H_2SO_4$ concentrations appear milky or heavily milky, and include visible precipitate accumulations, at the end of that period. Results similar to those are seen at when higher levels of dissolved glass are included in the sample solutions, and such results are expected for etching solutions containing HF concentrations not exceeding about 1.3M.

Based on these results, embodiments of the aqueous acidic glass etching solutions provided in accordance with the present disclosure include those containing an acid mixture consisting essentially of HF and $H_2SO_4$, wherein HF is present at a concentration not exceeding about 1.3M and $H_2SO_4$ is present at a concentration in the range of about 0.5 to about 1.5M. Also included are embodiments of such solutions that, through prior use, include dissolved glass in proportions below those interfering significantly with etching efficiencies. Those include solutions consisting essentially of the appropriate concentrations of HF and $H_2SO_4$ along with water and dissolved glass constituents.

Of course, the particular embodiments of aqueous acidic etching media and methods for using them described herein are presented for purposes of illustration only, and without any intention to limit or restrict the design, use or practice of those media or methods to the extent falling within the scope of the appended claims.

What is claimed is:

1. An acid bath for glass etching, the bath comprising an acid mixture consisting essentially of HF, $H_2SO_4$, water, dissolved glass constituents, and a $KSiF_6$ precipitate, wherein the concentration of HF does not exceed about 1.3M and $H_2SO_4$ is present at a concentration of about 0.5M to about 1.5M.

2. The solution of claim 1, wherein $H_2SO_4$ is present at a concentration of about 0.5M to about 0.9M.

3. A method for treating a glass article, the method comprising contacting the glass article with an aqueous acidic etching solution comprising an acid mixture consisting essentially of HF, $H_2SO_4$, water, dissolved glass constituents, and a $KSiF_6$ precipitate, wherein the concentration of HF does not exceed about 1.3M and $H_2SO_4$S present at a concentration of about 0.5M to about 1.5.

4. The method of claim 3, wherein the contacting is conducted at a temperature of at least about 30 °C.

5. The method of claim 3, wherein the contacting comprises spraying the glass article with the aqueous acidic etching solution at a solution temperature of about 30 to about 45 °C.

6. The method of claim 3, wherein the contacting is conducted for a time sufficient to remove a glass surface layer having a thickness of about 1 to about 4 micrometers from the glass article.

7. The method of claim 3, wherein the glass article comprises an alkali aluminosilicate glass comprising potassium oxide.

8. The method of claim 3, wherein the glass article is a glass sheet having a thickness not exceeding about 2 millimeters.

9. The method of claim 3, wherein the glass article comprises a potassium oxide-containing surface compression layer.

10. The method of claim 3, wherein the glass article comprises a surface compression layer having an exposed surface comprising potassium oxide in a concentration greater than about 10 weight percent.

11. The method of claim 3, wherein the aqueous acidic etching solution comprises dissolved glass constituents at a concentration of about 1 to about 12 grams per liter.

* * * * *

UNITED STATES PATENT AND TRADEMARK OFFICE
CERTIFICATE OF CORRECTION

Page 1 of 1

PATENT NO. : 9,926,225 B2
APPLICATION NO. : 14/363147
DATED : March 27, 2018
INVENTOR(S) : Yunfeng Gu et al.

It is certified that error appears in the above-identified patent and that said Letters Patent is hereby corrected as shown below:

On the Title Page

On page 2, Column 2, item (56), other publications, Line 3, delete "Confrence" and insert -- Conference --, therefor.

On page 2, Column 2, item (56), other publications, Line 4, delete "Microsytems," and insert -- Microsystems, --, therefor.

In the Claims

In Column 11, Line 15, Claim 3, delete "$H_2SO_4S$" and insert -- $H_2SO_4$ is --, therefor.

Signed and Sealed this
Thirty-first Day of March, 2020

Andrei Iancu
*Director of the United States Patent and Trademark Office*